United States Patent
Galle

(10) Patent No.: US 10,344,611 B2
(45) Date of Patent: Jul. 9, 2019

(54) COOLED HOT SECTION COMPONENTS FOR A GAS TURBINE ENGINE

(71) Applicant: United Technologies Corporation, Farmington, CT (US)

(72) Inventor: Nathan K. Galle, South Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 396 days.

(21) Appl. No.: 15/158,782

(22) Filed: May 19, 2016

(65) Prior Publication Data

US 2017/0335707 A1   Nov. 23, 2017

(51) Int. Cl.
*F02C 3/04*    (2006.01)
*F01D 11/08*   (2006.01)
*F01D 25/24*   (2006.01)

(52) U.S. Cl.
CPC ............ *F01D 11/08* (2013.01); *F01D 25/246* (2013.01); *F02C 3/04* (2013.01); *F05D 2220/32* (2013.01); *F05D 2230/11* (2013.01); *F05D 2230/21* (2013.01); *F05D 2240/11* (2013.01); *F05D 2250/21* (2013.01); *F05D 2250/231* (2013.01); *F05D 2250/232* (2013.01); *F05D 2260/607* (2013.01); *Y02T 50/671* (2013.01); *Y02T 50/675* (2013.01)

(58) Field of Classification Search
CPC ........ F01D 11/08; F01D 11/12; F01D 11/122; F01D 11/001; F01D 11/008
USPC ........................................................... 415/1
See application file for complete search history.

(56) References Cited

U.S. PATENT DOCUMENTS

| | | | |
|---|---|---|---|
| 3,918,835 A | 11/1975 | Yamarik et al. | |
| 2006/0140753 A1* | 6/2006 | Romanov | F01D 11/08 415/173.1 |
| 2007/0048122 A1* | 3/2007 | Van Suetendael, IV | B01D 46/40 415/115 |
| 2013/0340966 A1* | 12/2013 | Tholen | B22C 9/103 164/6 |
| 2015/0240721 A1 | 8/2015 | Campomanes et al. | |
| 2015/0315930 A1 | 11/2015 | Koonankeil et al. | |

FOREIGN PATENT DOCUMENTS

| | | |
|---|---|---|
| EP | 1990507 A1 | 11/2008 |
| EP | 2666972 A2 | 11/2013 |
| EP | 3054113 A1 | 8/2016 |
| EP | 3095962 A1 | 11/2016 |
| WO | 9837310 A1 | 8/1998 |
| WO | 2013163150 A1 | 10/2013 |

OTHER PUBLICATIONS

Extended European Search Report for Application No. 17171798. 6-1610, dated Oct. 20, 2017 (7 pp).

* cited by examiner

*Primary Examiner* — Justin D Seabe
*Assistant Examiner* — Jason Mikus
(74) *Attorney, Agent, or Firm* — Cantor Colburn LLP

(57) ABSTRACT

A gas turbine engine includes a turbine section including a plurality of blade outer air seals disposed therein, the blade outer air seals each including a body including a raised material that extends beyond the outer surface of the body and the raised material includes an inlet hole formed through the raised material.

16 Claims, 3 Drawing Sheets

COOLED HOT SECTION COMPONENTS FOR A GAS TURBINE ENGINE

BACKGROUND

The present disclosure relates to hot section components for gas turbine engines, more particularly to cooled hot section components for gas turbine engines with inlet holes defined therein, including but not limited to blade outer air seals (BOAS), vanes, and blades.

Blade outer air seals (BOAS), vanes, blades and other hot components can be disposed in turbine sections of turbomachines with inlet holes for cooling these hot section components. In such uses, inlet holes of these hot section components can be exposed to particles and other debris.

Accordingly, it is desirable to provide cooled hot section component inlet holes that can minimize exposure to particles and other debris.

BRIEF SUMMARY

According to one embodiment, a blade outer air seal for a gas turbine engine includes a body including a raised material that extends beyond the outer surface of the body and the raised material includes an inlet hole formed through the raised material.

In addition to one or more of the features described above, or as an alternative, further embodiments could include that the raised material is prismatoidal.

In addition to one or more of the features described above, or as an alternative, further embodiments could include that the raised material is cylindrical.

In addition to one or more of the features described above, or as an alternative, further embodiments could include that the raised material is conical.

In addition to one or more of the features described above, or as an alternative, further embodiments could include that the raised material is hemispherical.

In addition to one or more of the features described above, or as an alternative, further embodiments could include that the inlet hole is disposed at an angle relative to the raised material.

In addition to one or more of the features described above, or as an alternative, further embodiments could include that the inlet hole is cast in the raised material.

In addition to one or more of the features described above, or as an alternative, further embodiments could include that the inlet hole is drilled in the raised material.

In addition to one or more of the features described above, or as an alternative, further embodiments could include that the inlet hole is electrically machined in the raised material.

In addition to one or more of the features described above, or as an alternative, further embodiments could include that the inlet hole is in fluid communication with a radial edge hole.

In addition to one or more of the features described above, or as an alternative, further embodiments could include that the raised material extends beyond a raised outer edge of the outer surface.

In addition to one or more of the features described above, or as an alternative, further embodiments could include that the raised material is substantially smaller than the outer surface.

According to one embodiment, a gas turbine engine includes a turbine section including a plurality of blade outer air seals disposed therein, the blade outer air seals each including a body including a raised material that extends beyond the outer surface of the body and the raised material includes an inlet hole formed through the raised material.

In addition to one or more of the features described above, or as an alternative, further embodiments could include that the raised material is prismatoidal.

In addition to one or more of the features described above, or as an alternative, further embodiments could include that the raised material is cylindrical.

In addition to one or more of the features described above, or as an alternative, further embodiments could include that the raised material is conical.

In addition to one or more of the features described above, or as an alternative, further embodiments could include that the raised material is hemispherical.

In addition to one or more of the features described above, or as an alternative, further embodiments could include that the inlet hole is disposed at an angle relative to the raised material.

In addition to one or more of the features described above, or as an alternative, further embodiments could include that the inlet hole is cast in the raised material.

According to an embodiment, a method to prevent obstruction of an inlet hole via particles, the method includes, providing an airflow to a blade outer air seal and directing the airflow in a convoluted path to divert the particles via the blade outer air seal, the blade outer air seal including: a body including a raised material that extends beyond the outer surface of the body and the raised material includes an inlet hole formed through the raised material.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
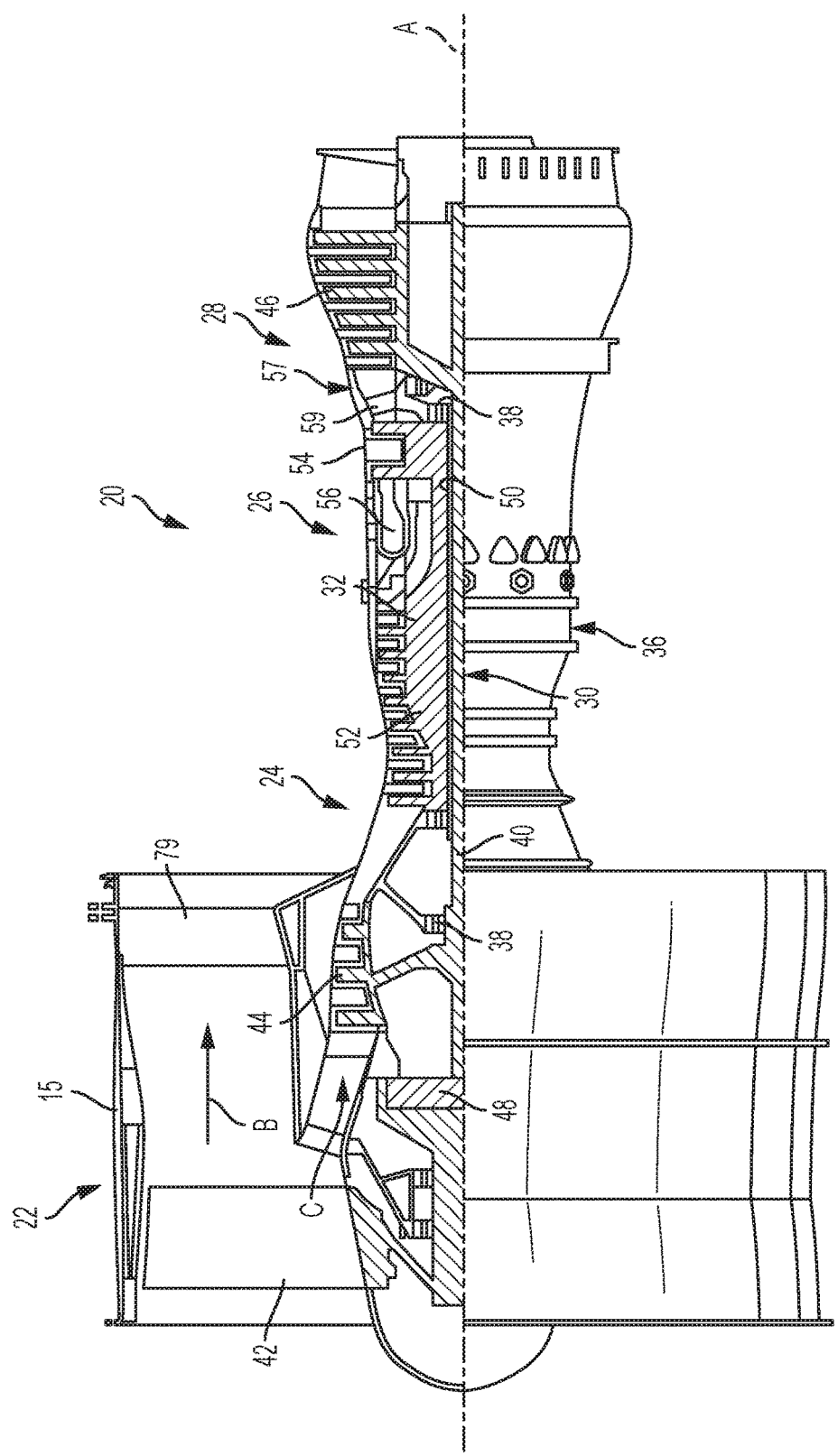
FIG. 1 is a schematic, partial cross-sectional view of a turbomachine in accordance with this disclosure.
Figure 2:
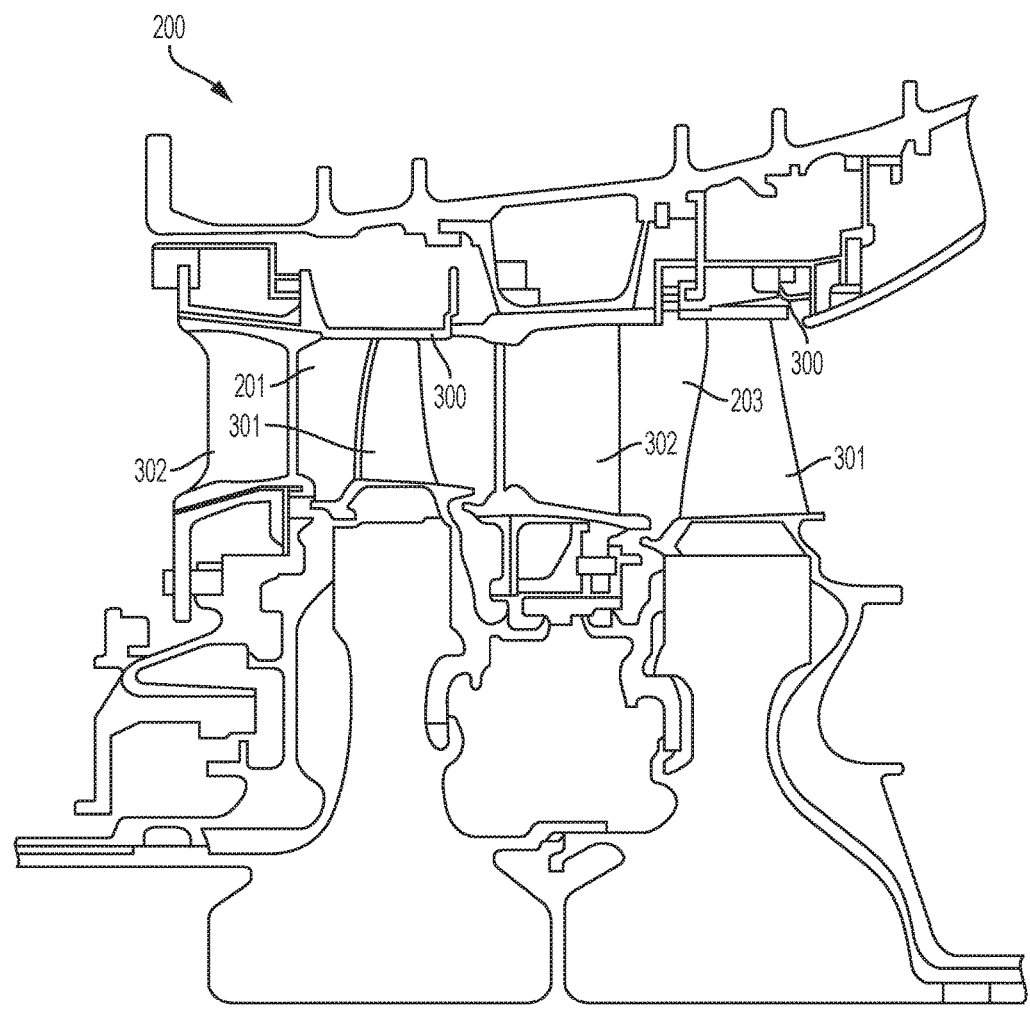
FIG. 2 is a cross-sectional view a turbomachine turbine section in accordance with this disclosure, showing a plurality of blade outer air seals with inlet holes disposed therein.
Figure 3:
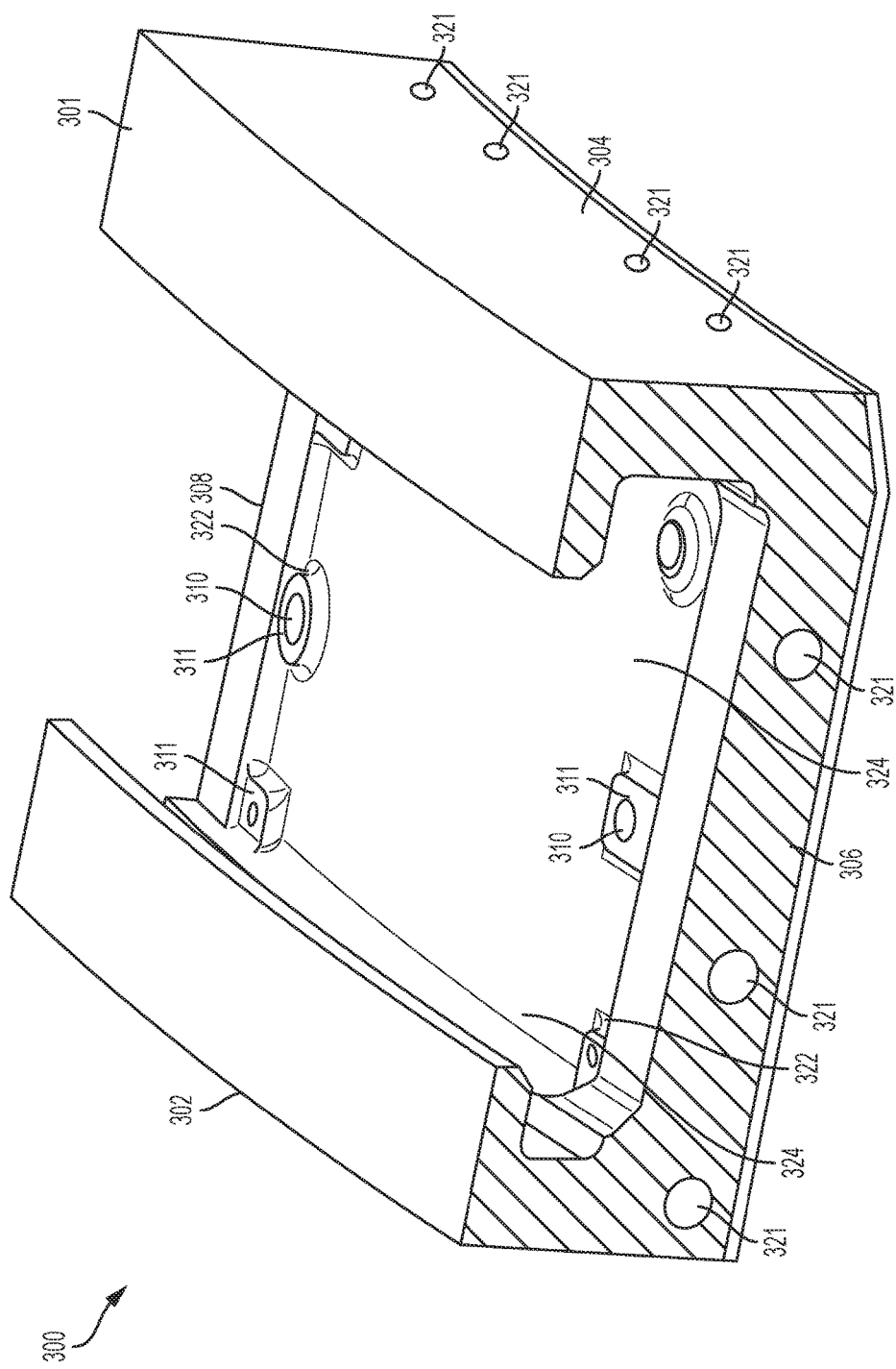
FIG. 3 is a perspective view of an embodiment of a blade outer air seal in accordance with this disclosure, showing inlet holes disposed therein.

Reference will now be made to the drawings wherein like reference numerals identify similar structural features or aspects of the subject disclosure. For purposes of explanation and illustration, and not limitation, an illustrative view of an embodiment of a blade outer air seal (BOAS) in accordance with the disclosure is shown in FIG. 3 and is designated generally by reference character 300. Other embodiments and/or aspects of this disclosure are shown in FIGS. 1 and 2. The systems and methods described herein can be used to provide enhanced particle avoidance for inlet holes of a BOAS.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The illustrated engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in illustrated gas turbine engine 20 is illustrated as a gear system 100 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan gear system 100 may be varied. For example, gear system 100 may be located aft of combustor section 26 or even aft of turbine section 28, and fan section 22 may be positioned forward or aft of the location of gear system 100.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Referring to FIG. 2, the turbine section 28 of FIG. 1 is shown. In the illustrated embodiment, a turbine section 200 is shown including a plurality of blade outer air seals (BOAS) 300, blades 301 and vanes 302. In certain embodiments, the turbine section 200 can include at least one BOAS 300, blade 301, or vane 302 having inlet holes formed raised material as described herein. In certain embodiments, the at least one BOAS 300, blade 301, or vane 302 can be disposed in a first stage 201 of the turbine section 200. Another BOAS 300, blade 301, or vane 302 can be disposed in a second stage 203 of the turbine section 200 which is aft of the first stage 201.

Referring to FIG. 3, in accordance with an embodiment of this disclosure, a cooled hot section component 300 is shown. Leakage of flow-path air may occur in turbomachinery between the tips of a rotating blade structure and the outer static structure. In certain embodiments, the cooled hot section component 300 can be used to provide a sealing relationship between a rotating turbomachine blade (e.g., a turbine blade) and a stationary component of a turbomachine to prevent flow from leaking around a tip of the turbomachine blade. In the illustrated embodiment, the cooled hot section component 300 includes a body 301 with inlet holes 310 and surface 311. During operation, debris and particles present in the airflow may block or otherwise obstruct inlet holes 310, preventing cooling of the cooled hot section component 300, especially in desert environments. By raising the inlet holes 310 above the cooled hot section component body 301, performance, safety, and durability can be maintained, preventing repairs and replacements of the cooled hot section component 300 and other components.

In the illustrated embodiment, the cooled hot section component body 301 includes lateral edges 302 and 304, radial edges 308 and 306, and a cooled hot section component outer surface 324. In the illustrated embodiment, the lateral edges 302, 304 and the radial edges 308, 306 can provide sealing and containment for a rotating turbomachine blade. In the illustrated embodiment, the cooled hot section component outer surface 324 can receive cooling airflow that may be directed to the inlet holes 310. The cooling airflow may include particles and other debris that can obstruct the inlet holes 310.

In the illustrated embodiment, a plurality of inlet holes 310 can be formed in the cooled hot section component body 301. In the illustrated embodiment, the inlet holes 310 can be cast, drilled, electrical discharge machined, etc. into the cooled hot section component body 301. In the illustrated embodiment, the inlet holes 310 are formed perpendicularly relative to the cooled hot section component body 301. In certain embodiments, the inlet holes 310 can be disposed at angles relative to the cooled hot section component body 301 to allow for airflow in desired portions of the cooled hot section component body 301 for desired cooling. Further, in certain embodiments, the inlet holes 310 can be in fluid communication with exit holes 321 to allow for a desired airflow path. The inlet holes 310 can allow for a cooling airflow to cool the cooled hot section component 300.

In the illustrated embodiment, the inlet holes 310 are formed through surface 311. In certain embodiments, inlet holes 310 can be formed in any suitable location on the cooled hot section component body 301. The surface 311 is raised relative to the cooled hot section component outer surface 324 to prevent debris and particles present in the airflow from entering the inlet holes 310. In the illustrated embodiment, the inlet holes 310 are formed on the raised surface 311. The raised surface 311 can have a generally prismatoidal, conical, hemispherical or round shape. In the illustrated embodiment, the raised surface 311 can be cast as part of the cooled hot section component body 301. The raised surface can transition to the cooled hot section component outer surface 324 via the edge 322. The edge 322 can be radiused or chamfered to improve flow characteristics or reduce stress concentrations. In the illustrated embodiment, the raised surface 311 is substantially smaller than the cooled hot section component outer surface 324.

Advantageously, the use of raised surface 311 can create convoluted air flow paths to be received by the inlet holes 310. The convoluted paths can divert dirt and particles from the inlet holes 310 by moving the inlet holes 310 away from flush surfaces such as the cooled hot section component outer surface 324. Advantageously, the raised surface 311 can reduce the amount of particles in the airflow through inlet holes 310 while having a minimal effect on weight, cost and performance of the cooled hot section component 300. In certain embodiments, the raised surface 311 can be retrofit or otherwise can be added to existing cooled hot section components.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A blade outer air seal for a gas turbine engine, comprising:
   a body including lateral edges, radial edges, and an outer surface, wherein the lateral edges and the radial edges provide sealing and containing for a rotating turbomachine blade,
   the outer surface of the body including a plurality of raised material surfaces that are spaced about the outer surface,
   each of the raised material surfaces being arranged in two sets of raised material surfaces, each of the sets of raised material surfaces being disposed adjacent a respective one of the radial edges, each of the sets of raised material surfaces including at least two raised material surfaces that are mutually spaced between the lateral edges,
   the plurality of raised material surfaces extending beyond the outer surface of the body, the plurality of raised material surfaces comprising beveled edges and being smaller than the outer surface,
   a plurality of holes distributed among the respective plurality of raised material surfaces, so that each of the plurality of raised material surfaces includes one of the plurality of holes,
   wherein the plurality of holes are a plurality of raised inlet holes formed through the plurality of raised material surfaces and formed perpendicular to the body so that each of the plurality of holes is raised above the outer surface, and
   wherein the plurality of raised surfaces create convoluted air flow paths to be received by the plurality of holes, and
   wherein the radial edges include exit holes in fluid communication with the plurality of raised inlet holes.

2. The blade outer air seal of claim 1, wherein the raised material is prismatoidal.

3. The blade outer air seal of claim 1, wherein the raised material is cylindrical.

4. The blade outer air seal of claim 1, wherein the raised material is conical.

5. The blade outer air seal of claim 1, wherein the raised material is hemispherical.

6. The blade outer air seal of claim 1, wherein at least one of the inlet holes is cast in the raised material.

7. The blade outer air seal of claim 1, wherein at least one of the inlet holes is drilled in the raised material.

8. The blade outer air seal of claim 1, wherein at least one of the inlet holes is electrically machined in the raised material.

9. The blade outer air seal of claim 1, wherein at least one of the inlet holes is in fluid communication with an exit hole.

10. A gas turbine engine, comprising:
    a turbine section including a plurality of blade outer air seals disposed therein, the blade outer air seals each including:
    a body including lateral edges, radial edges, and an outer surface, wherein the lateral edges and the radial edges provide sealing and containing for a rotating turbomachine blade, the outer surface of the body including a plurality of raised material surfaces that are spaced about the outer surface, each of the raised material surfaces being arranged in one of two sets of raised material surfaces, each of the sets of raised material surfaces being disposed adjacent a respective one of the radial edges, each of the sets of raised material surfaces including at least two raised material surfaces that are mutually spaced between the lateral edges, the plurality of raised material surfaces extending beyond the outer surface of the body, the plurality of raised material surfaces comprising beveled edges and being smaller than the outer surface, a plurality of holes distributed among the respective plurality of raised material surfaces, so that each of the plurality of raised material surfaces includes one of the plurality of holes, wherein the plurality of holes are a plurality of raised inlet holes formed through the plurality of raised material surfaces and formed perpendicular to the body so that each of the plurality of holes is raised above the outer surface, and wherein the plurality of raised surfaces create convoluted air flow paths to be received by the plurality of holes, and wherein the radial edges include exit holes in fluid communication with the plurality of raised inlet holes.

11. The gas turbine engine of claim 10, wherein the raised material is prismatoidal.

12. The gas turbine engine of claim 10, wherein the raised material is cylindrical.

13. The gas turbine engine of claim 10, wherein the raised material is conical.

14. The gas turbine engine of claim 10, wherein the raised material is hemispherical.

15. The gas turbine engine of claim 10, wherein at least one of the inlet holes is cast in the raised material.

16. A method to prevent obstruction of an inlet hole via particles, the method comprising:

providing an airflow to a blade outer air seal and directing the airflow in a convoluted path to divert the particles via the blade outer air seal, the blade outer air seal including:

a body including lateral edges, radial edges, and an outer surface, wherein the lateral edges and the radial edges provide sealing and containment for a rotating turbomachine blade, the outer surface of the body including a plurality of raised material surfaces that are spaced about the outer surface, each of the raised material surfaces being arranged in one of two sets of raised material surfaces, each of the sets of raised material surfaces being disposed adjacent a respective one of the radial edges, each of the sets of raised material surfaces including at least two raised material surfaces that are mutually spaced between the lateral edges, the plurality of raised material surfaces extending beyond the outer surface of the body, the plurality of raised material surfaces comprising beveled edges and being smaller than the outer surface, a plurality of holes distributed among the respective plurality of raised material surfaces, so that each of the plurality of raised material surfaces includes one of the plurality of holes, wherein the plurality of holes are a plurality of raised inlet holes formed through the plurality of raised material surfaces and formed perpendicular to the body so that each of the plurality of holes is raised above the outer surface, and wherein the plurality of raised surfaces create convoluted air flow paths to be received by the plurality of holes, and wherein the radial edges include exit holes in fluid communication with the plurality of raised inlet holes.

* * * * *